United States Patent
Proust et al.

(10) Patent No.: US 9,708,422 B2
(45) Date of Patent: Jul. 18, 2017

(54) METHOD FOR PREPARING FUNCTIONALIZED GRAFT POLYMERS

(71) Applicant: The Lubrizol Corporation, Wickliffe, OH (US)

(72) Inventors: Nicolas Proust, Painesville, OH (US); Michael J. Covitch, Cleveland Heights, OH (US)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 15/034,029

(22) PCT Filed: Nov. 25, 2014

(86) PCT No.: PCT/US2014/067263
§ 371 (c)(1),
(2) Date: May 3, 2016

(87) PCT Pub. No.: WO2015/088769
PCT Pub. Date: Jun. 18, 2015

(65) Prior Publication Data
US 2016/0280811 A1    Sep. 29, 2016

Related U.S. Application Data

(60) Provisional application No. 61/913,983, filed on Dec. 10, 2013.

(51) Int. Cl.
| | | |
|---|---|---|
| *C08F 8/32* | (2006.01) | |
| *C10M 149/06* | (2006.01) | |
| *C08F 8/48* | (2006.01) | |
| *C10M 149/10* | (2006.01) | |
| *C10M 177/00* | (2006.01) | |
| *C10M 149/04* | (2006.01) | |

(52) U.S. Cl.
CPC ............ *C08F 8/32* (2013.01); *C08F 8/48* (2013.01); *C10M 149/04* (2013.01); *C10M 149/06* (2013.01); *C10M 149/10* (2013.01); *C10M 177/00* (2013.01); *C10M 2217/024* (2013.01); *C10M 2217/028* (2013.01); *C10M 2217/06* (2013.01); *C10N 2230/02* (2013.01); *C10N 2240/102* (2013.01)

(58) Field of Classification Search
CPC ........... C08C 19/36; C08C 19/22; C08F 8/46; C08F 8/32
See application file for complete search history.

(56) References Cited

U.S. PATENT DOCUMENTS

| | | | | |
|---|---|---|---|---|
| 4,520,171 A * | 5/1985 | Diveley | ............ | C08L 23/02 525/102 |
| 5,182,041 A * | 1/1993 | Benfarmeo | ........... | C10L 1/2364 508/231 |
| 5,565,161 A | 10/1996 | Auda et al. | | |
| 5,663,126 A | 9/1997 | Boden et al. | | |
| 6,107,257 A | 8/2000 | Valcho et al. | | |
| 6,723,796 B2 | 4/2004 | Goldblatt et al. | | |
| 7,981,847 B2 | 7/2011 | Goldblatt et al. | | |
| 8,338,343 B2 * | 12/2012 | Meessen | ................... | C08F 8/32 508/221 |
| 8,410,031 B2 | 4/2013 | Meessen et al. | | |
| 2006/0025316 A1 * | 2/2006 | Covitch | ................. | C10L 1/221 508/459 |
| 2010/0189661 A1 * | 7/2010 | Musa | .................. | A61K 8/8164 424/40 |

FOREIGN PATENT DOCUMENTS

| | | |
|---|---|---|
| WO | 2006/084698 | 8/2006 |
| WO | 2011/107336 | 9/2011 |

OTHER PUBLICATIONS

International Search Authority, International Search Report, Aug. 24, 2015 for International Patent Application No. PCT/US14/067263.
International Search Authority, Written Opinion, Aug. 24, 2015 for International Patent Application No. PCT/US14/067263.

* cited by examiner

*Primary Examiner* — Robert C Boyle
(74) *Attorney, Agent, or Firm* — Christopher D. Hilker; David M. Shold; Teresan W. Gilbert

(57) ABSTRACT

An acylated hydrocarbon polymer is aminated by reacting a primary or secondary aromatic amine which is solid at room temperature with an acyl group of the polymer, by: supplying a melt of the acylated polymer; supplying a solution of the aromatic amine in a polar aprotic solvent which has a boiling point of at least about 15° C., a melting point below about 40° C., and a dielectric constant of at least about 5° at 25° C.; mixing the solution at 140° C. to 185° C.; and cooling the resulting amine-reacted polymer with a liquid while retaining the polar aprotic solvent in the polymer.

20 Claims, No Drawings

METHOD FOR PREPARING FUNCTIONALIZED GRAFT POLYMERS

BACKGROUND OF THE INVENTION

The disclosed technology relates to a method for preparing a nitrogen-containing polymer, useful as a dispersant viscosity modifier, by reacting a melt of a functionalized polymer with a solution of an amine.

Functionalized hydrocarbon polymers such as olefin copolymers are known for use as dispersant viscosity modifiers. Viscosity modifiers in general are polymeric materials, such as ethylene/alpha-olefin copolymers, which, when added to a fluid such as lubricating oil, improve the viscosity index, that is, reduce the change in viscosity of the lubricant as a function of temperature. Certain viscosity modifiers are also designed to contain additional chemical functionality as a part of their structure, in order to impart additional benefits to a lubricant. For instance, relatively polar molecules such as amines or amides may be included to provide a measure of dispersant property to the polymer, which may be used to supplement or replace dispersancy otherwise provided by separate dispersant molecules. In some cases, the relatively polar molecules may be attached to the polymer molecule via a condensation reaction between a primary or secondary amino group and an acid or anhydride group that is a part of the polymer chain or that is appended from the polymer chain, typically through a grafting reaction. Various methods have been suggested for providing such functionalized polymers.

U.S. Pat. No. 6,107,257, Valcho et al., Aug. 22, 2000, discloses highly grafted, multi-functional olefin copolymer which is the reaction product of an acylated olefin copolymer and a polyamine. An acylated ethylene-propylene copolymer was reacted with N-phenyl-1,4,-phenylenediamine in the presence of a surfactant. Typically the polyamine compound is dissolved in a surfactant and added to a mineral or synthetic lubricating oil or solvent solution containing the acylated olefin copolymer. The solution may be heated to 120° to 200° C. It is also possible to add a surfactant solution of the polyamine compound to zones downstream from the graft reaction-vent zones in a twin screw extruder reactor. A suitable class of surfactants includes aliphatic or phenolic alkoxylates. Preferred surfactants contain a functional group, e.g., —OH. Examples include Surfonic® N-40, N-60, L-24-5, L-46-7, Neodol®23-5, 25-7 and Tergitol® surfactants. The total amount of surfactant in the finished additive may be 10 wt. % or less. In an example, an acylated ethylene-propylene copolymer was reacted with N-phenyl-1,4-phenylenediamine, in the presence of a surfactant, at 160° C.

U.S. Pat. No. 8,338,343, Meessen et al., Dec. 25, 2012, discloses (A) a first extruder, grafting olefinic carboxylic acylating agent onto a copolymer; and (b) reacting, in a second extruder, the acylated copolymer made in (A) with a polyamine such a N-arylphenylenediamine. The second step is preferably carried out in the presence of an acid. The polyamine may be dosed to the acylated polymer melt as a melt, solution, or suspension in solvents or oil. A surfactant may be used to solubilize the amine. A second reactor, such as a static mixer, allows substantial conversion of the acylated polymer and the polyamine. The product from the second reactor device is discharged into a connected finishing extruder, which devolatilizes the functionalized polymer product.

U.S. Pat. No. 6,723,796, Goldblatt et al., Apr. 20, 2004, discloses methods for making graft copolymers, in an extruder, wherein at least one of the reactants is introduced in the presence of a polar solvent [abstract]. The extrusion process with reactant introduction in a solvent is said to allow for greater reaction efficiency in utilization of raw materials. The polar solvent is preferably water.

U.S. Pat. No. 8,410,031, Meessen et al., Apr. 2, 2013, discloses a process for preparing an imidized polymer in a mixing or kneading device, by a reaction in the presence of an acid of a mixture containing a polymer having anhydride groups or derivatives thereof and an aromatic polyamine compound. At least one of the amine groups is a primary amine. A purification zone in an extruder is a region where the solvent, unreacted reagents, by-products, co-products and other volatile impurities from the reaction are removed from the polymer.

U.S. Pat. No. 7,981,847, Goldblatt et al., Jul. 19, 2011, discloses lubricating oil compositions containing graft copolymers. The graft copolymer contains one or more ethylenically-unsaturated aliphatic or aromatic, nitrogen- and oxygen-containing graftable monomers grafted to a polyolefin. The monomer may, but need not be, recovered from the product mixture. A graftable monomer comprising the reaction product of maleic anhydride and 4-aminodiphenylamine is disclosed.

U.S. Pat. No. 5,663,126, Boden et al., Sep. 2, 1997, discloses polar grafted polyolefins containing an ethylenically-unsaturated nitrogen- or oxygen-containing graftable monomer such as N-vinylimidazole. The reaction can be carried out by providing a melted reactant composition in an extruder or other polymeric mixer substantially in the absence of a solvent. The grafting may also be carried on in the presence of a solvent having less than about 15% by weight of reactive aromatic constituents; the polyolefin is disclosed as dissolved in a solvent. The graftable monomer may be added neat, in solid or molten form, or cut back with a solvent. The solvents include volatile solvents which are readily removable from the grafted polyolefin after the reaction is complete; alternatively, they may be base oils.

U.S. Pat. No. 5,565,161, Auda et al., Oct. 15, 1996, discloses a process for producing a functionalized thermoplastic polymer. Multiple sequential chemical reactions are carried out in an extruder. In an example, an ethylene-propylene copolymer is sequentially maleated and then imidized in a single reactor-extruder. A controlled amount of water is injected into the extruder and subsequently removed by a vacuum vent. Feed of water is said to lead to less colored products.

WO 2006/084698, DSM (Meessen), Aug. 17, 2006, discloses a highly grafted multifunctional olefin polymer by reacting an olefin copolymer with an olefinic carboxylic acid acylating agent, preferably in the absence of a hydrocarbon solvent in, e.g., an extruder. The polymer will be dissolved in a Group I, II, III or IV oil and reacted with a specific polyamine. In an example, pelletized intermediate product is mixed with Group I oil and reacted with an amine such as N-phenyl-1,4-phenylenediamine which may be dissolved in an ethoxylated lauryl alcohol surfactant.

There remains a need for a convenient method for imparting amine, amide, imide, or other nitrogen or polar functionality to a viscosity modifier polymer by a reaction of a primary or secondary amine with the viscosity modifier polymer. It is often desirable to use a melt process for the polymer, so that the polymer does not need to be dissolved in a solvent such as mineral oil. This is often accomplished by providing the polymer in a melted (molten) state by processing it in an extruder or other melting and mixing device, and, indeed, acylated hydrocarbon polymers may be conveniently prepared by extruder grafting processes. If a polymer such as an acylated copolymer is then to be reacted with an amine, such as an aromatic amine that is normally solid at room temperature, the amine must normally be supplied in a melted form at an elevated temperature. The equipment for maintaining a supply of melted amine may be cumbersome, and the amine itself may be subject to undesirable thermal or oxidative degradation if it is maintained at elevated temperature for an extended period of time. However, if the amine is provided as a room-temperature solution in a relatively volatile solvent, the solvent normally must be removed from the mixture after reaction is complete. If it is provided as a mixture with a non-volatile surfactant material, the surfactant may lead to problems with foaming upon subsequent contact with water as in an underwater pelletizer. If a mineral oil is used as a solvent, the degree of solubility of the relatively polar amine therein may be so low that a great excess of the mineral oil may be required in order to assure solubility.

SUMMARY OF THE INVENTION

The disclosed technology, therefore, solves the problem of reacting a melt of an acylated hydrocarbon polymer with a normally-solid aromatic amine, without the aforementioned drawbacks.

The disclosed technology provides a method for aminating an acylated hydrocarbon polymer by reacting a primary or secondary aromatic amine which is solid at room temperature with an acyl group of said polymer, comprising the steps of:

(a) supplying a melt of said acylated hydrocarbon polymer; (b) supplying a liquid solution of about 20 to about 60 percent by weight of said aromatic amine in a polar aprotic solvent which has a boiling point (at atmospheric pressure) of at least about 150° C., a melting point below about 40° C., and a dielectric constant of at least about 5 at 25° C.; (c) mixing the solution of said aromatic amine with the melt of said polymer in a mixing device at a temperature of about 140° C. to about 185° C.; whereby said aromatic amine reacts with acyl group of said polymer; and (d) cooling the resulting amine-reacted polymer.

The disclosed technology also provides a method for aminating an acylated hydrocarbon polymer by reacting a primary or secondary aromatic amine which is solid at room temperature with an acyl group of said polymer, comprising the steps of: (a) supplying a melt of said acylated hydrocarbon polymer; (b) supplying a liquid solution of 20 to 60 percent by weight of said aromatic amine in a polar aprotic solvent which has a boiling point (at atmospheric pressure) of at least 150° C., a melting point below 40° C., and a dielectric constant of at least 5 at 25° C.; (c) mixing the solution of said aromatic amine with the melt of said polymer in a mixing device at a temperature of 140° C. to 185° C.; whereby said aromatic amine reacts with an acyl group (or a substantial majority of the acyl groups) of said polymer; and (d) cooling the resulting amine-reacted polymer (e.g., an extrudate) with liquid water while retaining a majority of the polar aprotic solvent (e.g., at least 50% or 70% or 85%) in the resulting cooled amine-reacted polymer.

The disclosed technology also provides a lubricant composition comprising (a) an oil of lubricating viscosity; (b) a functionalized hydrocarbon polymer comprising a nitrogen-containing aromatic moiety linked to the backbone of the hydrocarbon polymer through an amide or imide linkage; and (c) a polar aprotic solvent in an amount of about 1 to about 40 percent by weight of the amount of said polymer; as well as a method for lubricating a mechanical device with such as lubricant composition.

DETAILED DESCRIPTION OF THE INVENTION

Various preferred features and embodiments will be described below by way of non-limiting illustration.

The present invention is useful for providing functionality to a hydrocarbon polymer, such as an olefin copolymer or a hydrocarbon homopolymer, or an olefin homopolymer, or a copolymer of a vinyl aromatic monomer and one or more conjugated diene monomers. Polymers containing diene monomers are often hydrogenated. The hydrocarbon polymer may be of any of a variety of architectures: They may be linear, branched, or multiple armstar polymers (multiple arms emanating from a core). If they are copolymers, they may be random, block, or tapered block copolymers.

Olefin copolymer (prior to functionalization) are well known materials, often used as viscosity modifiers for lubricants. Olefin copolymers are polymers containing two or more olefins as constituent monomer units. For purposes of this definition, ethylene is considered an olefin, and many olefin copolymers are copolymers of ethylene with an olefin having more carbon atoms, such as 3-12 carbon atoms or 3-6 or 3-4 or 3 carbon atoms. In common use are ethylene-propylene copolymers. Additional olefins may also be present, such as butylene or hexene monomers, such as ethylene/propylene/1-butene copolymers. The olefins may be terminal olefins (that is, 1-olefins or α-olefins) or internal olefins. The olefins may also comprise dienes, such as non-conjugated dienes, which may be employed in amounts of 0 to 10 wt. % or 0 to 5 or 0.1 to 5 or 1 to 5 weight percent. Any unreacted double bonds arising from the use of dienes may be removed by hydrogenation, if desired. In certain embodiments, greater than 90 percent, or greater than 95 percent, or greater than 98 percent of the olefinic double bonds may be removed by hydrogenation.

The relative amounts of monomers within a copolymer, such as an olefin copolymer, may be selected by the skilled person based on well-known requirements. For example, the resulting polymer should exhibit solubility in lubricating oil. For this reason, a polymer which has an excessive amount of ethylene monomer units may not be desirable since, at the extreme, polyethylene is a crystalline material that does not exhibit good oil solubility. If the copolymer comprises ethylene and propylene monomer units, it may be useful to provide 40-80 weight percent ethylene units, or 40 to 55, or 70 to 80 percent. The remaining monomer units may be propylene units, e.g., 20-60 weight percent, 45 to 60, or 20 to 30 weight percent. The ethylene content of the copolymer is measured using 13C nuclear magnetic resonance (NMR) or infrared spectroscopy (IR).

The polymer can be a substantially amorphous polymer (e.g., less than 5% crystallinity) or a partially crystalline polymer having a degree of crystallinity of at least 15%, such as 20% to 30%, depending on the particular monomer(s) or comonomers selected. Degree of crystallinity may be measured by differential scanning calorimetry or x-ray diffraction. In certain embodiments the crystallinity is low enough to render the polymer fully soluble in API Group I, II, III and IV oils at polymer concentrations less than 3 wt. %.

The weight average molecular weight of the hydrocarbon polymer, prior to acylation, that is, the backbone polymer, may be 20,000 to 500,000, or 50,000 to 300,000, or 80,000 to 250,000 or 80,000 to 500,000. The weight average molecular weight ($M_w$) of the polymer (A) may be measured by gel permeation chromatography (GPC), also known as size-exclusion chromatography, employing polystyrene standards. The polydispersity of the polymer (that is, $M_w/M_n$) may be 1.05 to 8 or 1.05 to 3 or 1.05 to 2.5. The weight average molecular weight of the subsequently-prepared acylated polymer may be substantially the same (or in a given instance perhaps moderately lower, due to possible molecular weight loss during processing) as the hydrocarbon polymer from which it is prepared, above, and may thus be any of the above-recited values such as 20,000 to 500,000 or 80,000 to 500,000.

An olefin copolymer may be prepared by copolymerizing ethylene and the other monomers using known catalysts and polymerization techniques, such as Ziegler-Natta or metallocene coordination catalysis.

Hydrocarbon homopolymers are also well known materials. Examples include polypropylene, poly-n-butylene, polyisobutylene, hydrogenated polyisoprene, and polymers of higher olefins. Polyethylene itself is less suitable for certain embodiments of the present invention in that its crystallinity may lead to relatively low solubility in mineral for lubrication applications. Accordingly, in certain embodiments the monomer may contain 3 to 12 or 4 to 8 atoms. Such polymers may be prepared by polymerizing the corresponding olefin monomer using known catalysts and polymerization techniques.

Copolymers of vinyl aromatic monomers and one or more conjugated diene monomers are also well known. A typical aromatic monomer is styrene. Typical diene monomers include isoprene or butadiene. Styrene-diene copolymers and their method of preparation and functionalization are described in US Patent Application 2012-0178656, Sutton et al, Jul. 12, 2012. Styrene-diene copolymers are also described in the *Kirk-Othmer Encyclopedia of Chemical Technology*, third edition, John Wiley and Sons, New York, 1979, volume 8, pages 626 to 632 (and other locations in the same work).

The hydrocarbon polymer will be an acylated polymer, that is, it will contain groups that will be reactive with amine or hydroxy containing monomers, i.e., containing acylating groups. The acylating groups may be carboxylic acid groups or reactive equivalents thereof, such as ester groups, acid halide groups, or anhydride groups. The acylating groups may be incorporated into the chain, that is, the backbone, of the hydrocarbon polymer during the polymerization process, or they may be subsequently grafted onto the polymer. In one embodiment, an acylating agent such as maleic anhydride, maleic acid, itaconic anhydride, or itaconic acid is grafted onto a polymer such as an olefin copolymer, optionally including a free radical initiator, in solution or in the melt. In one embodiment the acylating agent is maleic anhydride. Such grafting reaction are well known means of imparting functionality to olefin copolymers and are described, for instance, in many of the above-referenced documents, such as U.S. Pat. No. 8,338,343, Meessen et al., see col. 4 line 36 through col. 5 line 21.

The extent of incorporation of the acylating agent onto the polymer may be, for instance, 0.5 to 6 weight percent, or 0.8 to 5 percent, or 1 to 4, or 2 to 3 weight percent of acid (or anhydride) functionality on the polymer. If maleic anhydride is used as the acylating agent, the resulting polymer may contain the above amounts of succinic anhydride (succinic being the ethylenically saturated material corresponding to maleic).

The acylation of the hydrocarbon polymer may be conducted in the melt in an extruder or another suitable mixing device. The grafted polymer may be extruded, cooled, and pelletized if desired, separately from the reaction with the amine described below. Alternatively, the grafting reaction may be conducted as a first step in a reaction wherein the melted, grafted polymer is subsequently reacted with an amine. This may be conducted in the same extruder (using a portion of the extruder upstream from the reaction with the amine), or the molten, grafted product of a first extruder or other mixing/reaction device may be fed in molten form into a second extruder for subsequent reaction with amine.

The acylated hydrocarbon polymer, if it is not already molten, will be melted by heating to 140 to 185° C., that is, a temperature at which it will be sufficiently fluid to be mixed with an amine solution, as described below.

Suitable mixing devices include heated mills, heated mixers such as Banbury™ mixers and planetary mixers, and extruders. A Banbury mixer may comprise two intersecting rotating spiral-shaped blades encased in segments of cylindrical housings. The extruder will have at least one segment of a screw suitable for mixing the polymer melt with the amine, described below. Extruders are very well known in the polymer processing industry and include single screw extruders and twin screw extruders with either syn-rotatory or con-rotatory screws. Twin screw extruders are particularly suitable for mixing and reacting components.

Typically a polymer (if it is not already provided as a melt) will be fed into an extruder through a hopper into a melting zone in which the temperature of the polymer is raised, through external heating and mechanical energy input to the effective melting temperature of the polymer. The temperature of the polymer within the extruder will typically be maintained at 140° C. to 185° C., or 150° C. to 170° C. The temperature may be more or less constant throughout the extruder or it may be varied in different zones. The molten polymer will typically be conveyed, through the screw action of the extruder, into subsequent zones or barrel sections which may be designed for addition of liquids or solids, and additional zones for mixing (working) of the polymer, and optionally venting of volatiles such as water of condensation. Venting may be conducted with the aid of vacuum. However, the volatilization conditions should not be so severe as to remove a substantial amount of the aprotic polar solvent, described below. Also, a venting zone may be useful if the polymer is being acylated in the same extruder that is used for reaction with the aromatic amine. In that case, any unreacted acylating agent may be removed by volatilization before the amine is introduced. The polymer, after reaction, will be extruded and cooled, and it may be cooled by immersion in water, such as by being fed from the extruder into an underwater pelletizer or other device.

The acylated polymer, within the mixing device, will be reacted with a primary or secondary aromatic amine. The aromatic amine will contain an amine nitrogen atom that is capable of reacting with (condensing with) the acyl functionality of the acylated polymer, typically to form an amide or imide linkage, although some incomplete reaction product in the form of an amine salt may also be present.

Aromatic amines are also disclosed in U.S. Publication 2012-0178659 (Barton et al., Jul. 12, 2012) and include those that can be represented by the general structure $NH_2$—Ar or T-NH—Ar, where T may be an alkyl or aromatic group, Ar is an aromatic group, including nitrogen-containing aromatic groups and Ar groups including any of the following structures:

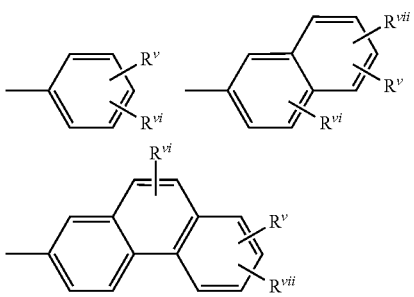

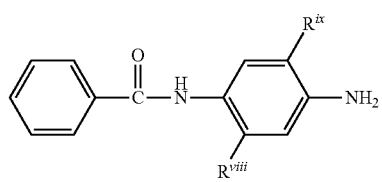

as well as multiple non-condensed or linked aromatic rings. In these and related structures, $R^v$, $R^{vi}$, and $R^{vii}$ can be independently, among other groups disclosed herein, —H, —C1-18 alkyl groups, nitro groups, —NH—Ar, —N=N—Ar, —NH—CO—Ar, —OOC—Ar, —OOC—$C_{1-18}$ alkyl, —COO—$C_{1-18}$ alkyl, —OH, —O—$(CH_2CH—O)_n C_{1-18}$ alkyl groups, and —O—$(CH_2CH_2O)_n$Ar (where n is 0 to 10).

Aromatic amines include those amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, especially those derived from naphthalene. Examples of aromatic amines include aniline, N-alkylanilines such as N-methylaniline and N-butylaniline, di-(para-methylphenyl)amine, 4 aminodiphenylamine, N,N-dimethylphenylene diamine, naphthylamine, 4-(4-nitrophenyl-azo)aniline (disperse orange 3), sulfamethazine, 4-phenoxyaniline, 3-nitro-aniline, 4-aminoacetanilide (N-(4-aminophenyl)acetamide)), 4-amino-2-hydroxy-benzoic acid phenyl ester (phenyl amino salicylate), N-(4-aminophenyl)-benzamide, various benzyl amines such as 2,5-dimethoxybenzylamine, 4-phenylazoaniline, and substituted versions of these. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which the amine nitrogen is a part of an aromatic ring, such as 3 aminoquinoline, 5-aminoquinoline, and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide or 3 aminopropylimidazole. Yet other amines include 2,5-dimethoxybenzylamine.

Additional aromatic amines and related compounds include aminocarbazoles, benzoimidazoles, aminoindoles, aminopyrroles, amino-indazolinones, mercaptotriazoles, aminophenol thiazines, aminopyridines, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl amino}butanamide. Other aromatic amines which can be used include various aromatic amine dye intermediates containing multiple aromatic rings linked by, for example, amide structures. Examples include materials of the general structure and isomeric variations thereof, where $R^{viii}$ and $R^{ix}$ are independently alkyl or alkoxy groups such as methyl, methoxy, or ethoxy. In one instance, $R^{viii}$ and $R^{ix}$ are both —OCH3 and the material is known as Fast Blue RR [CAS#6268-05-9].

In another instance, $R^{ix}$ is —$OCH_3$ and $R^{viii}$ is —$CH_3$, and the material is known as Fast Violet B [99-21-8]. When both $R^{viii}$ and $R^{ix}$ are ethoxy, the material is Fast Blue BB [120-00-3]. U.S. Pat. No. 5,744,429 discloses other aromatic amine compounds, particularly aminoalkylphenothiazines. N-aromatic substituted acid amide compounds, such as those disclosed in U.S. Patent application 2003/0030033 A1, may also be used for the purposes of this invention. Suitable aromatic amines include those in which the amine nitrogen is a substituent on an aromatic carboxyclic compound, that is, the nitrogen is not $sp^2$ hybridized within an aromatic ring.

The aromatic amine may have an N—H group capable of condensing with the pendant carbonyl containing group of the acylated hydrocarbon polymer. Certain aromatic amines are commonly used as antioxidants. Of particular importance in that regard are alkylated diphenylamines such as nonyldiphenylamine and dinonyldiphenylamine. To the extent that these materials will condense with the carboxylic functionality of the polymer chain, they are also suitable for use within the present invention. However, it is believed that the two aromatic groups attached to the amine nitrogen may lead to steric hindrance and reduced reactivity. Thus, suitable amines include those having a primary nitrogen atom (—$NH_2$) or a secondary nitrogen atom in which one of the hydrocarbyl substituents is a relatively short chain alkyl group, e.g., methyl. Among such aromatic amines are 4-phenylazoaniline, 4-amino-diphenylamine, 2-aminobenzimidazole, and N,N-dimethylphenylenediamine. Some of these and other aromatic amines may also impart antioxidant performance to the polymers, in addition to dispersancy and other properties.

Other amines include anthranilate esters as disclosed in U.S. Publication 2012-0040876, (Gieselman et al., Feb. 16, 2012). These are materials represented by the general formula

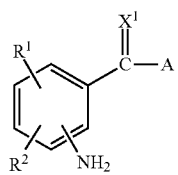

(I)

wherein $X^1$ is oxygen or sulfur; A is —$X^2$—$R^3$ or —$R^3$ where $X^2$ is oxygen or sulfur and $R^3$ is a hydrocarbyl group; $R^1$ and $R^2$ are each independently hydrogen or a hydrocarbon group, or where $R^1$ and $R^2$ are linked forming a hydrocarbyl ring. Specific examples include 2-aminobenzoic acid-2,4,5,8-tetramethylnonyl ester, 2-aminobenzoic acid decyl/octyl ester, and 2-aminobenzoic acid 2-ethylhexyl ester.

In other embodiments, the anthranilate ester may be described as the reaction product of an alcohol and a hetero bicyclic aromatic compound consisting of a nitrogen-containing ring and an aromatic ring, where the nitrogen-containing ring has groups at the 2 and 4 positions, and where the ring also contains an additional oxygen atom, typically in between the groups. The aromatic ring may have up to four substituent groups attached to the carbon atoms in the ring. These substituent groups may be hydrocarbyl groups. In one embodiment there are no substituent groups on the aromatic ring. A suitable hetero bicyclic aromatic compound is isatoic anhydride. In some embodiments the anthranilate ester additive of the present invention, as described by any of the formulas above, is derived from isatoic anhydride. In some embodiments the anthranilate ester additive is derived from isatoic anhydride and an alcohol component consisting of 2,4,6,8-tetramethyl-nonanol, a mixture of linear alcohols where the alcohols may contain 8 to 10 carbon atoms, 2-ethylhexanol, or combinations thereof. In still other embodiments the additive is derived from isatoic anhydride and 2,4,6,8-tetramethyl-nonanol and/or a mixture of linear alcohols where the alcohols may contain 8 to 10 carbon atoms. Isatoic anhydride is represented by

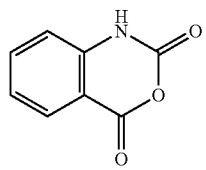 [SMILES: O=c1[nH]c2ccccc2c(=O)o1]

Suitable amines thus include 3-nitroaniline, 4-(4-nitrophenylazo)aniline (Disperse Orange 3), aminodiphenylamine, the reaction product of isatoic anhydride and aminodiphenylamine, and mixtures thereof. The reaction product of isatoic anhydride and aminodiphenylamine is represented by

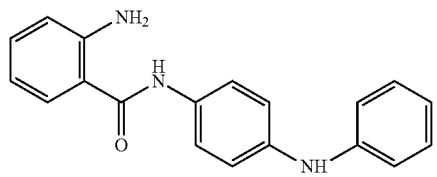 [SMILES: Nc1ccccc1C(=O)Nc1ccc(Nc2ccccc2)cc1]

The amount of the aromatic amine will typically be an amount sufficient to react by condensation with most or all of the acyl functionality on the acylated hydrocarbon polymer, that is, approximately a stoichiometric amount. The stoichiometric amount based on imide formation (from succinic anhydride groups) will be about one half the stoichiometric amount based on amide formation, which might be characteristic of reaction with acyl groups that are not capable of cyclic imide formation.

The aromatic amines of the present technology will be those that are solid at room temperature (about 25° C.). Such amines would normally need to be melted in order to be metered into a molted polymer in an extruder or other device, and handling melts of normally solid materials can be problematic. Among other issues, maintaining an amine at an elevated temperature for a relatively long period of time can lead to thermal or oxidative deterioration of the amine. Alternatively, the amine might be dissolved in low boiling solvent, but this may lead to difficulties with rapid evaporation or flashing off of the solvent when it encounters the hot polymer melt, or, alternatively or additionally, the need to remove residual volatile solvent from the reacted polymer.

The aromatic amine, therefore, will be dissolved in a suitable solvent prior to reaction with the acylated polymer. Such a solvent will be a polar aprotic solvent which has a boiling point (at atmospheric pressure) of at least 150° C., or at least 160° C. or at least 165° C., and up to or greater than 300° C. or up to 290° C.; and a melting point below 40° C., e.g., below 30° C. or 20° C. or 10° C. or 0° C. The relatively high boiling point will be to avoid flashing off of the solvent when encountering the hot polymer melt and to minimize loss of the solvent from the vent port(s) designed to remove relatively low boiling point contaminants and products of reaction. The melted polymer will typically be maintained at a temperature of less than the boiling point of the polar aprotic solvent, at the time the melted polymer is mixed with the solution of the amine. The relatively low melting point of the solvent will be to facilitate preparation of the solution of the amine, without the need to maintain and manipulate the solvent at elevated temperature. Thus, the desirable solution of the amine may be maintained at about room temperature, that is, 15° C. to 40° C. (or 20 to 35° C. or 25 to 30° C.) at the time it is added to the polymer melt in the mixing device.

The polar aprotic solvent will also have a dielectric constant of at least 5 at 25° C., e.g., 5 to 40 or 5 to 30. In other embodiments, the dielectric constant may be at least 5.1 or at least 5.2 or at least 7 or 10 or 20, up to 50 or 40 or 30 or 25. The dielectric constant, which is a measure of polarity of the solvent, should be within the identified range in order to assure solubility of the amine in the solvent at a reasonable level. Typically the aromatic amine will be dissolved in the solvent in an amount of 20 to 60 percent by weight, or alternatively 25 to 50 percent or 35 to 45 percent. The amount of the polar aprotic solvent (which bears the dissolved aromatic amine) that is supplied to the acylated polymer may in certain embodiments be 1 to 40% of the weight of the acylated polymer. Alternatively, the amount of the polar aprotic solvent may be 2 to 30% of the weight of the polymer. In certain useful embodiments, the amount of the polar aprotic solvent may be 3 to 25%, or 5 to 15%, or 3 to 10% of the weight of the acylated polymer. These amounts may be calculated from the relative feed rates of the polymer and of the amine solution in the polar aprotic solvent as they are fed to the extruder or other mixing device. The amounts of the polar aprotic solvent that remain in the final pelletized product will be slightly lower, since the amine will increase the mass of the acylated polymer. Thus the amounts of polar aprotic solvent that remain in the final pelletized product may be 1 to 30%, or 2 to 20%, or 5 to 12%. In a given example, the amounts of the polar aprotic solvent in the final pelletized product might be reduced somewhat by loss due to evaporation from the vent port or dissolution in the quenching water. Thus the amount of the polar aprotic solvent in the final pelletized product may be 80 to 100% of the above identified amounts, such as 80%, 85%, 90%, 95%, 98%, 99%, or 100%.

The polar aprotic solvent will, in some embodiments, be relatively soluble in mineral oil or in the solution of the functionalized polymer in mineral oil. This is because the solvent will, desirably, be retained in the polymer and will be introduced by the polymer into a lubricant or concentrate containing mineral oil, and its presence may provide certain benefits as described hereafter. Its relative solubility in the lubricant or concentrate may be desirable for uniformity of the product. By "relatively soluble" it is meant that that solvent should be soluble or miscible (without obvious separation or haziness) at 25° C. when mixed at 1 to 2.5% by weight with a 4 mm$^2$/s (cSt, at 100° C.) API Group I mineral oil containing 10 to 35 weight percent of an acylated hydrocarbon polymer reacted with an aromatic amine. In another embodiment, the solvent may be judged as appropriately soluble if it is soluble or miscible (without obvious separation or haziness) at 25° C. when mixed at 2.5% by weight in a 4 mm$^2$/s (cSt) at 100° C. API Group I mineral oil.

Suitable solvents for the aromatic amines may include N,N-dimethylformamide, DMF (b.p. 153° C., m.p. −61° C., dielectric constant 36.7); N,N-dimethyl-acetamide, DMAC (b.p. 165° C., m.p. −20° C., dielectric constant 37.78); sulfolane (tetramethylenesulfone, b.p. 285° C., m.p. 27° C., dielectric constant 43.3); Triglyme™ (tri(ethylene glycol) dimethyl ether, b.p. 216° C., m.p. −45° C., dielectric constant ~5.2); di(ethylene glycol) dibutyl ether (b.p 256° C., m.p. −60° C., dielectric constant ~5.2); dipropylene glycol dimethyl ether ("Proglyme™," b.p. 175° C., m.p. −71° C., dielectric constant 5.17); methyl ether of >C9 alcohol, ethoxylated with >5 moles of ethylene oxide ("Higlyme™," b.p. >300° C., m.p. −5° C., dielectric constant 5.20); 1,3-dimethyl-2-imidazolidinone, DMEU (b.p. 225° C., m.p. 8° C., dielectric constant 37.60); 1,3-dimethyl-3,4,5,6-tetrahydro-2(1H)-pyrimidinone, DMPU (b.p. 246° C., m.p. −24° C., dielectric constant 36.12); hexamethylphosphoric triamide, HMPT (b.p. 233° C., m.p. 7° C., dielectric constant 29.30); N-methylpyrrolidone, NMP (b.p. 202° C., m.p. −24° C., dielectric constant 32.2); and dimethylsulfoxide, DMSO (b.p. 189° C., m.p. 18° C., dielectric constant 46.68). It may be that certain solvents are more effective than others for certain aromatic amines, in terms of ease of handling or ease of solubility of the amine. Such determinations or adjustments are well within the abilities of those skilled in the art.

The process of dissolving the amine in the solvent is well within the ability of the person of ordinary skill. The solution can be effected by mixing with stirring and optional heating for an amount of time that will be apparent under the circumstances (e.g., 1 minute to 1 hour, or 2 to 10 minutes). The resulting solution may be added to the polymer melt when the solution is at or near room temperature. The solution will be in a liquid form at the time it is added to the polymer melt.

The reaction of the aromatic amine with the acylated polymer may be conducted in the absence or substantial absence (or alternatively in the presence) of oil such as mineral oil or other oil of lubricating viscosity. Substantial absence of oil means less than 10 weight percent oil based on the total of oil plus acylated polymer, or alternatively 0.001 to 5 or 0.01 to 2 or 0.05 to 1 percent oil, or less than 1 percent, less than 0.1 percent, or less than 0.01 percent oil. The reaction may also be conducted in the absence (or alternatively in the presence) of added acid, e.g., in the absence of a catalytic amount of added acid.

After addition of the aromatic amine solution, and after the aromatic amine has opportunity to react with the polymer but typically before cooling of the polymer, an additional non-aromatic amine may be added if desired. This may be an aliphatic amine having a single primary amino group. Typical amines include N,N-dimethylaminopropylamine or aminopropylmorpholine. Such amines may be useful to react with any acyl functionality on the polymer that remains unreacted with the possibly less reactive aromatic amine.

After the acylated polymer melt is reacted with the aromatic amine, it will be subsequently cooled. The polymer may be cooled by contact with air or by contact with a cooling liquid. The cooling liquid may be an oil or water; typically cooling may be performed by contacting the acylated polymer melt with water. Typically, the extrudate will be sent to an underwater pelletizer (a well-known device) wherein the polymer is rapidly cooled below its melting (or solidification) temperature and is cut into pellets under water or within a stream of flowing water. The wet pellets may be subsequently dried by passing them through a spin dryer. Adding small amounts of an anti-blocking agent to the pelletizer water to ensure smooth operation of the spin dryer is well known to those skilled in the art. Examples of anti-blocking agents include calcium stearate, zinc stearate, aluminum stearate and silicon compounds.

While it has been known to dissolve amines in a surfactant material prior to reacting with an acylated polymer, the presence of surfactant is liable to give rise to problems of foaming in the underwater pelletizer or the spin dryer. When the aprotic polar solvents of the present invention are used, however, there is no or little evidence of deleterious foam formation. Moreover, the presence of the relatively small amount of polar aprotic solvent improves the handing, flowability, and viscosity performance of formulations or concentrates containing the amine-condensed polymer, compared with concentrates or formulations containing the amine-condensed polymer in the absence of the aprotic polar solvent. Improved flowability and handling of a formulation or concentrate may be revealed in increased tangent delta (tan delta) values, defined as G"/G', where G' is complex elastic modulus and G" is the complex viscous loss modulus (G"), typically measured over a temperature range of 15° C. to 98° C. These values are measured on a rheometer such as a cone-and-plate rheometer operated in in oscillation mode.

The nitrogen-containing polymers prepared by the disclosed technology find use as dispersant viscosity modifiers in lubricants for mechanical devices such as engines. They may also be useful in greases. Particular use may be found in lubricants for diesel engines, such as passenger car diesel engines or heavy duty diesel engines, in which the functional polymers of this invention may function as effective soot dispersants. The engines may be sump-lubricated. In various embodiments the engine may be a gasoline engine, a diesel engine, a compression-ignited engine, a spark-ignited engine, a port-fuel injected engine, or a gasoline direct injection engine.

Engine lubricants typically contain a variety of components. One such component is an oil of lubricating viscosity, also referred to as a base oil. The base oil may be selected from any of the base oils in Groups I-V of the American Petroleum Institute (API) Base Oil Interchangeability Guidelines, namely

| Base Oil Category | Sulfur (%) | Saturates(%) | Viscosity Index |
|---|---|---|---|
| Group I | >0.03 and/or | <90 | 80 to 120 |
| Group II | ≤0.03 and | ≥90 | 80 to 120 |
| Group III | ≤0.03 and | ≥90 | >120 |
| Group IV | All polyalphaolefins (PAOs) | | |
| Group V | All others not included in Groups I, II, III or IV | | |

Groups I, II and III are mineral oil base stocks. The oil of lubricating viscosity can include natural or synthetic oils and mixtures thereof. Mixture of mineral oil and synthetic oils, e.g., polyalphaolefin oils and/or ester oils, may be used.

Natural oils include animal oils and vegetable oils (e.g. vegetable acid esters) as well as mineral lubricating oils such as liquid petroleum oils and solvent-treated or acid treated mineral lubricating oils of the paraffinic, naphthenic, or mixed paraffinicnaphthenic types. Hydrotreated or hydrocracked oils are also useful oils of lubricating viscosity. Oils of lubricating viscosity derived from coal or shale are also useful.

Synthetic oils include hydrocarbon oils and halosubstituted hydrocarbon oils such as polymerized and interpolymerized olefins and mixtures thereof, alkylbenzenes, polyphenyl, alkylated diphenyl ethers, and alkylated diphenyl sulfides and their derivatives, analogs and homologues thereof. Alkylene oxide polymers and interpolymers and derivatives thereof, and those where terminal hydroxyl groups have been modified by, e.g., esterification or etherification, are other classes of synthetic lubricating oils. Other suitable synthetic lubricating oils comprise esters of dicarboxylic acids and those made from $C_5$ to $C_{12}$ monocarboxylic acids and polyols or polyol ethers. Other synthetic lubricating oils include liquid esters of phosphorus-containing acids, polymeric tetrahydrofurans, silicon-based oils such as poly-alkyl-, polyaryl-, polyalkoxy-, or polyaryloxysiloxane oils, and silicate oils.

Other synthetic oils include those produced by Fischer-Tropsch reactions, typically hydroisomerized Fischer-Tropsch hydrocarbons or waxes. In one embodiment oils may be prepared by a Fischer-Tropsch gas-to-liquid synthetic procedure as well as other gas-to-liquid oils.

Unrefined, refined, and rerefined oils, either natural or synthetic (as well as mixtures thereof) of the types disclosed hereinabove can used. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Rerefined oils often are additionally processed to remove spent additives and oil breakdown products.

The amount of oil may be 20 to 90 percent or 30 to 85 percent or 40 to 80 percent in a concentrate, and higher amounts in a fully-formulated lubricant. Typical amounts in a fully-formulated lubricant may include 50-98 percent by weight, or 60 to 95, or 70 to 92, or 75 to 90, or 80 to 88 percent. The amount of the oil of lubricating viscosity present is typically the balance remaining after subtracting from 100 wt. % the sum of the amount of the compound of the invention and the other performance additives Another component frequently used is a viscosity modifier (in addition to the polymers made by the present technology, which are themselves viscosity modifiers). Viscosity modifiers (VM) and dispersant viscosity modifiers (DVM) are well known. Examples of VMs and DVMs may include polymethacrylates, polyacrylates, polyolefins, hydrogenated vinyl aromatic-diene copolymers (e.g., styrene-butadiene, styrene-isoprene), styrene-maleic ester copolymers, and similar polymeric substances including homopolymers, copolymers, and graft copolymers. The DVM may comprise a nitrogen-containing methacrylate polymer, for example, a nitrogen-containing methacrylate polymer derived from methyl methacrylate and dimethylaminopropyl amine.

Examples of commercially available VMs, DVMs and their chemical types may include the following: polyisobutylenes (such as Indopol™ from BP Amoco or Parapol™ from ExxonMobil); olefin copolymers (such as Lubrizol™ 7060H, 7065C, and 7067C from Lubrizol and Lucant™ HC-2000 and HC-600 from Mitsui); hydrogenated styrene-diene copolymers (such as SV™150 and SV™140 from Infineum and LZ® 7408A, and 7308 from Lubrizol); styrene/maleate copolymers, which are dispersant copolymers (such as LZ® 3702 and 3715 from Lubrizol); polymethacrylates, some of which have dispersant properties (such as those in the Viscoplex™ series from Evonik, the Hitec™ series of viscosity index improvers from Afton, and LZ® 7760 and LZ® 7761A from Lubrizol); polymethacrylate star polymers (such as LZ® 87708 from Lubrizol); olefin-graft-polymethacrylate polymers (such as Viscoplex™ 2-500 and 2-600 from Evonik); and hydrogenated polyisoprene star polymers (such as SV™200 and SV™260 from Infinium). Viscosity modifiers that may be used are described in U.S. Pat. Nos. 5,157,088, 5,256,752 and 5,395,539. The VMs and/or DVMs may be used in the functional fluid at a concentration of up to 20% by weight. Concentrations of 1 to 12%, or 3 to 10% by weight may be used.

The polymers of the present technology, in their role as dispersant viscosity modifiers, will typically be present in a lubricant in amounts of 0.1 to 15 percent by weight, or 0.2 to 10 or 0.5 to 7 or 1 to 5 percent. Amounts in a concentrate may be significantly higher, such as 1 to 50 percent, or 2 to 35 or 4 to 25 or 10 to 20 percent.

Dispersants are well known in the field of lubricants and include primarily what is known as ashless dispersants and polymeric dispersants. Ashless dispersants are so-called because, as supplied, they do not contain metal and thus do not normally contribute to sulfated ash when added to a lubricant. However they may, of course, interact with ambient metals once they are added to a lubricant which includes metal-containing species. Ashless dispersants are characterized by a polar group attached to a relatively high molecular weight hydrocarbon chain. Typical ashless dispersants include N-substituted long chain alkenyl succinimides, having a variety of chemical structures including typically

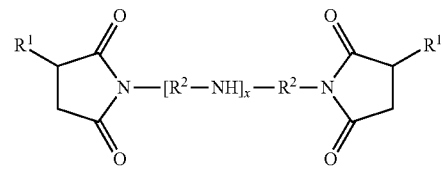

where each $R^1$ is independently an alkyl group, frequently a polyisobutylene group with a molecular weight ($M_n$) of 500-5000 based on the polyisobutylene precursor, and $R^2$ are alkylene groups, commonly ethylene ($C_2H_4$) groups. Such molecules are commonly derived from reaction of an alkenyl acylating agent with a polyamine, and a wide variety of linkages between the two moieties is possible beside the simple imide structure shown above, including a variety of amides and quaternary ammonium salts. In the above structure, the amine portion is shown as an alkylene polyamine, although other aliphatic and aromatic mono- and polyamines may also be used. Also, a variety of modes of linkage of the $R^1$ groups onto the imide structure are possible, including various cyclic linkages. The ratio of the carbonyl groups of the acylating agent to the nitrogen atoms of the amine may be 1:0.5 to 1:3, and in other instances 1:1 to 1:2.75 or 1:1.5 to 1:2.5. Succinimide dispersants are more fully described in U.S. Pat. Nos. 4,234,435 and 3,172,892 and in EP 0355895.

Another class of ashless dispersant is high molecular weight esters. These materials are similar to the above-described succinimides except that they may be seen as having been prepared by reaction of a hydrocarbyl acylating agent and a polyhydric aliphatic alcohol such as glycerol, pentaerythritol, or sorbitol. Such materials are described in more detail in U.S. Pat. No. 3,381,022.

Another class of ashless dispersant is Mannich bases. These are materials which are formed by the condensation of a higher molecular weight, alkyl substituted phenol, an alkylene polyamine, and an aldehyde such as formaldehyde. Mannich dispersants are described in more detail in U.S. Pat. No. 3,634,515.

Other dispersants include polymeric dispersant additives, which are generally hydrocarbon-based polymers which contain polar functionality to impart dispersancy characteristics to the polymer.

Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403.

Detergents include overbased detergents. Overbased materials, otherwise referred to as overbased or superbased salts, are generally single phase, homogeneous Newtonian systems characterized by a metal content in excess of that which would be present for neutralization according to the stoichiometry of the metal and the particular acidic organic compound reacted with the metal. The overbased materials are prepared by reacting an acidic material (typically an inorganic acid or lower carboxylic acid, preferably carbon dioxide) with a mixture comprising an acidic organic compound, a reaction medium comprising at least one inert, organic solvent (mineral oil, naphtha, toluene, xylene, etc.) for said acidic organic material, a stoichiometric excess of a metal base, and a promoter such as a phenol or alcohol. The acidic organic material will normally have a sufficient number of carbon atoms to provide a degree of solubility in oil. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5.

Such overbased materials are well known to those skilled in the art. Patents describing techniques for making basic salts of sulfonic acids, carboxylic acids, phenols, phosphonic acids, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

Salixarate detergents include overbased materials prepared from salicylic acid (which may be unsubstituted) with a hydrocarbyl-substituted phenol, such entities being linked through —CH$_2$— or other alkylene bridges It is believed that the salixarate derivatives have a predominantly linear, rather than macrocyclic, structure, although both structures are intended to be encompassed by the term "salixarate." Salixarate derivatives and methods of their preparation are described in greater detail in U.S. Pat. No. 6,200,936 and PCT Publication WO 01/56968.

The amount of detergent in lubricant formulations prepared encompassing the polymers of the present technology, may typically be at least 0.6 weight percent, such as 0.7 to 5 weight percent or 1 to 3 weight percent. Either a single detergent or multiple detergents can be present.

The lubricant may also contain a metal salt of a phosphorus acid. Metal salts of the formula

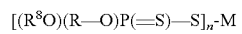

where $R^8$ and $R^9$ are independently hydrocarbyl groups containing 3 to 30 carbon atoms, are readily obtainable by heating phosphorus pentasulfide ($P_2S_5$) and an alcohol or phenol to form an O,O-dihydrocarbyl phosphorodithioic acid. The alcohol which reacts to provide the $R^8$ and $R^9$ groups may be a mixture of alcohols, for instance, a mixture of isopropanol and 4-methyl-2-pentanol, and in some embodiments a mixture of a secondary alcohol and a primary alcohol, such as isopropanol and 2-ethylhexanol. The resulting acid may be reacted with a basic metal compound to form the salt. The metal M, having a valence n, generally is aluminum, lead, tin, manganese, cobalt, nickel, zinc, or copper, and in many cases, zinc, to form zinc dialkyldithiophosphates. Such materials are well known and readily available to those skilled in the art of lubricant formulation. Suitable variations to provide good phosphorus retention in an engine are disclosed, for instance, in US published application 2008-0015129, see, e.g., claims. The amount may be 0.1 to 4 percent by weight, or 0.5 to 2 percent, or 0.75 to 1.25 percent by weight.

Another component may be an antioxidant. Antioxidants encompass phenolic antioxidants, which may be hindered phenolic antioxidants, one or both ortho positions on a phenolic ring being occupied by bulky groups such as t-butyl. The para position may also be occupied by a hydrocarbyl group or a group bridging two aromatic rings. In certain embodiments the para position is occupied by an ester-containing group, such as, for example, an antioxidant of the formula

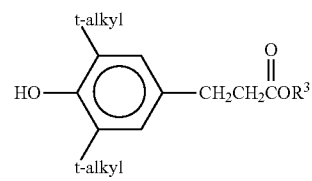

wherein $R^3$ is a hydrocarbyl group such as an alkyl group containing, e.g., 1 to 18 or 2 to 12 or 2 to 8 or 2 to 6 carbon atoms; and t-alkyl can be t-butyl. Such antioxidants are described in greater detail in U.S. Pat. No. 6,559,105.

Antioxidants also include aromatic amines. In one embodiment, an aromatic amine antioxidant can comprise an alkylated diphenylamine such as nonylated diphenylamine or a mixture of a di-nonylated and a mono-nonylated diphenylamine.

Antioxidants also include sulfurized olefins such as mono- or disulfides or mixtures thereof. These materials generally have sulfide linkages of 1 to 10 sulfur atoms, e.g., 1 to 4, or 1 or 2. Materials which can be sulfurized to form the sulfurized organic compositions of the present invention include oils, fatty acids and esters, olefins and polyolefins made thereof, terpenes, or Diels-Alder adducts. Details of methods of preparing some such sulfurized materials can be found in U.S. Pat. Nos. 3,471,404 and 4,191,659.

Molybdenum compounds can also serve as antioxidants, and these materials can also serve in various other functions, such as antiwear agents or friction modifiers. U.S. Pat. No. 4,285,822 discloses lubricating oil compositions containing a molybdenum- and sulfur-containing composition prepared by combining a polar solvent, an acidic molybdenum compound and an oil-soluble basic nitrogen compound to form a molybdenum-containing complex and contacting the complex with carbon disulfide to form the molybdenum- and sulfur-containing composition.

Typical amounts of antioxidants will, of course, depend on the specific antioxidant and its individual effectiveness, but illustrative total amounts can be 0.01 to 5 percent by weight or 0.15 to 4.5 percent or 0.2 to 4 percent.

Other materials that may be used include antiwear agents such as tartrate esters, tartramides, and tartrimides. Examples include oleyl tartrimide (the imide formed from oleylamine and tartaric acid) and oleyl diesters (from, e.g., mixed C12-16 alcohols). Other related materials that may be useful include esters, amides, and imides of other hydroxycarboxylic acids in general, including hydroxy-polycarboxylic acids, for instance, acids such as tartaric acid, citric acid, lactic acid, glycolic acid, hydroxy-propionic acid, hydroxyglutaric acid, and mixtures thereof. These materials may also impart additional functionality to a lubricant beyond antiwear performance. These materials are described in greater detail in US Publication 2006-0079413 and PCT publication WO2010/077630. Such derivatives of (or compounds derived from) a hydroxy-carboxylic acid, if present, may typically be present in the lubricating composition in an amount of 0.1 weight % to 5 weight %, or 0.2 weight % to 3 weight %, or greater than 0.2 weight % to 3 weight %.

Other additives that may optionally be used in lubricating oils include pour point depressing agents, extreme pressure agents, anti-wear agents, color stabilizers, and anti-foam agents. Such materials and their amounts are well known to those skilled in the lubricant arts.

As used herein, the term "condensation product" is intended to encompass esters, amides, imides and other such materials that may be prepared by a condensation reaction of an acid or a reactive equivalent of an acid (e.g., an acid halide, anhydride, or ester) with an alcohol or amine, irrespective of whether a condensation reaction is actually performed to lead directly to the product. Thus, for example, a particular ester may be prepared by a transesterification reaction rather than directly by a condensation reaction. The resulting product is still considered a condensation product.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is found in paragraphs [0137] to [0141] of published application US 2010-0197536.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The technology disclosed herein is useful for preparing functionalized polymers which in turn may be suitable for use as dispersant viscosity modifiers for lubricants. These applications may be better understood with reference to the following examples.

EXAMPLES

Extruder Setup. A 75 mm twin screw extruder is provided, having a 48:1 L/D ratio and rated at 224 kW (300 h.p.) at 580 r.p.m. The extruder is fitted with a set of screws comprising mixing and conveying blocks along its length. The extruder has 10 barrel sections with a port in the third section for injection of amine (or amine solution) and vacuum port positioned at the last barrel section. The barrel temperature is set to 150° C. to 170° C. For the following runs, blocks of maleic anhydride-grafted ethylene/propylene copolymer, $M_w$ about 100,000, containing about 3 weight percent of grafted maleic anhydride functionality, are mechanically ground into small pieces and fed via a loss-in-weight feeder into the first barrel of the extruder, at about 23 kg (50 lb.) per hour, that is, about 378 g/minute. Residence time of the copolymer in the extruder may be determined by adding a blue pigment to the feed throat and measuring the time for first appearance of blue in the polymer melt exiting the die plate. Residence times measured under conditions of these experiments may vary between about 2.25 and about 2.5 minutes. The extruder leads into an underwater pelletizer, and the resulting pellets are then fed to a spin dryer. The final product is collected as nearly completely dry pellets.

Amine Solution 1. A solution of 45% by weight aminodiphenylamine ("ADPA") is prepared in dimethylacetamide ("DMAC"). The solution has a kinematic viscosity at 40° C. of 5.57 mm$^2$/s (cSt), kinematic viscosity at 100° C. of 1.47 mm$^2$/s (cSt), density at 15.6° C. of 1.038 g/cm$^3$, and an ASTM D93 flash point of 76° C.

Amine Solution 2. A solution of a condensed aromatic amine is prepared in situ in DMAC. Equimolar quantities of isatoic anhydride and aminodiphenylamine are combined in an amount of DMAC such that the final mixture (after $CO_2$ evolution) is 45% by weight condensed amine. Reaction is effected by heating to 80° C. for 10 hours. The solution has a kinematic viscosity at 100° C. of 2.53 mm$^2$/s (cSt), specific gravity at 15.6° C. of 1.069 (ASTM D1298), and an ASTM D93 flash point of 73° C.

Amine Solution 3. A 48% solution is prepared of 3-nitroaniline in DMAC.

Amine Solution 4. A 48% solution is prepared of 3-nitroaniline in N-methylpyrrolidone ("NMP").

Amine Solution 5. A 45% solution is prepared of ADPA in NMP.

Amine Solution 6. A 45% solution is prepared in DMAC of a mixture of 3-nitroaniline and 4-(4-nitrophenylazo) aniline (Disperse Orange 3), 1:1.45 wt. ratio.

Amine Solution 7. an 80% solution is prepared of ADPA in Proglyde™ DMM, dipropylene glycol diether from Dow.

Amine Solution 8. A 50% solution is prepared of ADPA in tri(ethylene glycol) dimethyl ether.

Amine solution 9. A 45% solution is prepared of ADPA in di(ethylene glycol) dibutyl ether.

Amine solution 10. A 50% solution is prepared of ADPA in dimethylformamide.

Comparative Example A

A stable flow of the grafted ethylene-propylene copolymer (about 378 g/min, as described above) is established through the extruder and molten ADPA (not in solution) is injected via a piston pump located in barrel 3, at 17.6 mL per minute. After the process stabilizes, a sample of the pelletized copolymer product is collected and analyzed. It exhibits a melt index (ASTM D1238) of 11.34 g/10 min. (190° C., 2.16 kg). Infrared analysis of a thin film of the polymer indicates nearly complete conversion of the carbonyl functionality to the imide form. The product is in the form of dark brown pellets.

Example B

Comparative Example A is repeated except that Amine Solution 1 (at room temperature, i.e., without heating) is injected via the piston pump at 41.5 mL/min (about 43.1 g/min). The product is in the form of dark brown pellets having a melt index of 16-17 g/10 min and nearly complete conversion to imide. No evidence of foaming is observed in the water in the pelletizer.

Example C

Example B is repeated except that the Amine Solution 1 is injected at 43.5 mL/min (about 45.2 g/min). The results are substantially unchanged except that the melt index is 14.8 g/10 min. No evidence of foaming is observed in the water in the pelletizer.

Example D

Example B is repeated except that N,N-dimethylaminopropylamine (DMAPA, a liquid at room temperature) is injected by a second piston pump at barrel no. 8 at a rate of 1.96 mL/min. The conversion to imide is substantially unchanged. The melt index is 13.9 g/10 min. No evidence of foaming is observed in the water in the pelletizer.

Examples E through M

Example B is repeated except that Amine Solutions 2 through 10 are used, respectively.

Example N

Example B is repeated. A sample is collected and analyzed by infrared analysis, indicating 9 to 10.5 mmol/L imide concentration; the melt index is 18.1 to 19.2 g/10 minutes. (Imide concentration of solid amine-reacted polymer is expressed in terms of the concentration of a 13 wt. % solution of the polymer in a 100N API Group I mineral oil solvent. For example, if the imide concentration of a solid amine-reacted polymer is 76.9 mmol/L, its imide concentration in terms of a 13 wt. % solution is 76.9×0.13=10 mmol/L) 38 kg of pelletized product are collected. A portion of the pelletized product is passed through the extruder a second time without injecting additional amine solution, in order to determine if there is sufficient reaction time in the extruder to affect complete reaction of the amine with the anhydride groups of the copolymer. After pelletization, a sample of polymer is analyzed by IR and determined to have 14.0 to 14.4 mmol/L imide concentration and melt index of 16.3 to 17.1 g/10 minutes. Under these conditions, increasing residence time leads to more nearly complete reaction of the anhydride groups of the copolymer. One may conclude that the extent or completion of reaction of polymer with amine may be controlled or varied by varying the residence time in the extruder.

Example O

Example B is repeated. A sample is collected, and infrared analysis indicates 10 mmol/L imide concentration. The product is collected and passed through the extruder a second time, except that DMAPA is injected at 2 mL/min into barrel 3 in place of the ADPA/DMAC solution. After pelletization, a sample of the polymer is analyzed by IR and determined to have 16.5 mmol/L imide concentration. One may conclude that the extent of reaction of polymer with amine may be controlled or enhanced by the optional inclusion of an aliphatic amine.

Example P

The polymer from Example B is dissolved in a 100N Group I base oil at 13 wt. % polymer concentration. The solution is analyzed by IR and has 13.5 mmol/L imide concentration. 599.7 g of this polymer solution is heated to 160° C., and 0.315 g of DMAPA is added subsurface; the mixture is allowed to react for one hour. The imide concentration increases to 16.4 mmol/L, which is virtually the same as that achieved by DMAPA injection in Example K. One may conclude that post-reaction of an ADPA/DMAC-reacted product with DMAPA may lead to more nearly complete reaction of the anhydride groups of the polymer. This may be accomplished by increasing residence time in the extruder for both the aromatic amine and DMAPA reactions. Alternatively, the aromatic amine reaction with the acylated copolymer may be conducted in a first extruder, and the extrudate introduced into a second extruder (or passed through the first extruder a second time) wherein the DMAPA reaction takes place.

Comparative Example Q

Comparative example A is repeated except that Surfonic™ L24-5 (an ethoxylated alcohol surfactant available from Huntsman) is added to the feed throat of the extruder at 4.2 mL/min. A number of samples of the pelletized copolymer product collected under these conditions are analyzed. They exhibit melt index values of 12.8-16.1 g/10 min.

Comparative Example R

Comparative example A is repeated except that Surfonic™ L24-5 is added to the feed throat of the extruder at 12.5 mL/min. A sample of the pelletized copolymer product is collected and analyzed. It exhibits a melt index of 15.9 g/10 min. The experiment is aborted because copious amounts of white foam are observed spewing forth from the lid of the spin drier and the pelletizer water hold tank. The Surfonic™ L24-5 feed rate is lowered to 4.2 mL/min, and foaming in the spin dryer system subsides. Comparative Examples Q and R show that if a surfactant is used, its amount must be carefully controlled to avoid foaming. This difficulty is avoided by the presently disclosed technology.

Examples S, T and Reference Example U

The effect of the presence of DMAC solvent in the polymers of Examples B and C is evaluated. Oil concentrates are prepared containing 13 weight percent of polymer, in pellet form, from Example B and Example C and, for comparison (Reference Example U), 13 weight percent of pellets from Comparative Example A. The polymer pellets, in each case, are added to a 4.2 mm$^2$/sec (cSt, at 100° C.) API Group I mineral oil and heated at 120-130° C., with stirring, until the mixture is homogeneous. Concentrate Examples S and T (derived from polymers of Ex. B and Ex. C) contain about 0.7 weight percent DMAC arising from the solvent DMAC originally used to dissolve the amine. Concentrate Examples S and T have nearly identical bulk viscosity, about 907-920 mm$^2$/sec at 100° C., which is reduced from the value of Reference Example U which does not contain any DMAC (about 1048 mm$^2$/sec). This (desirable) reduction is equivalent to the reduction in bulk viscosity caused by inclusion of an equivalent amount of the commonly used surfactant Surfonic™ L24-5 (Surfactant A). That is, when Surfactant A is added to any of the concentrates S, T, or U, the resulting bulk viscosity of the concentrate is a function of the total amount of DMAC plus surfactant present, both DMAC and surfactant having an approximately equal effectiveness at reducing the viscosity, at Surfactant A levels of up to at least about 3 or 3.5 percent (and at least about 0.7% DMAC). However, DMAC may be added without the risk of foaming.

Thus, the residual DMAC present in the reacted polymer pellets is unexpectedly beneficial in leading to a reduced bulk viscosity of the polymer in an oil concentrate and resulting improved ease of handling. It effects this reduction in viscosity without leading to foaming problems in the cooling water of a polymer melt pelletizer.

Example V

Example A is substantially repeated but using, in place of the grafted ethylene-propylene copolymer, a comparable amount of a grafted styrene-isoprene block copolymer is employed.

Example W

Example A is substantially repeated by using, in place of the grafted ethylene-propylene copolymer, a comparable amount of a grafted polyisobutylene.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as optionally modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A method for aminating an acylated hydrocarbon polymer by reacting a primary or secondary aromatic amine which is solid at room temperature with an acyl group of said polymer, comprising the steps of:
   (a) supplying a melt of said acylated hydrocarbon polymer;
   (b) supplying a liquid solution of about 20 to about 60 percent by weight of said aromatic amine in a polar aprotic solvent which has a boiling point (at atmospheric pressure) of at least about 150° C., a melting point below about 40° C., and a dielectric constant of at least about 5 at 25° C.;
   (c) mixing the solution of said aromatic amine with the melt of said polymer in a mixing device at a temperature of about 140° C. to about 185° C.; whereby said aromatic amine reacts with acyl group of said polymer; and
   (d) cooling the resulting amine-reacted polymer.

2. The method of claim 1 wherein the amine-reacted polymer is cooled by a cooling liquid comprising water or an oil.

3. The method of claim 1 wherein a majority of the polar aprotic solvent is retained in the cooled amine-reacted polymer.

4. The method of claim 1 wherein the cooling of the amine-reacted polymer is effected in an underwater pelletizer.

5. The method of claim 1 wherein the mixing device comprises an extruder, wherein the polymer is melted and the solution of the amine is mixed with the melted polymer in said extruder.

6. The method of claim 1 wherein the acylated hydrocarbon polymer comprises an acylated olefin copolymer.

7. The method of claim 1 wherein the acylated hydrocarbon polymer comprises an acylated hydrocarbon homopolymer.

8. The method of claim 1 wherein the acylated hydrocarbon polymer comprises an acylated copolymer of a vinyl aromatic monomer and one or more conjugated diene monomers.

9. The method of claim 8 wherein the vinyl aromatic monomer is styrene and the conjugated diene monomer is isoprene or butadiene.

10. The method of claim 6 wherein the monomers of the acylated hydrocarbon copolymer comprise ethylene and at least one alpha-olefin of 3 to about 12 carbon atoms and, optionally, a non-conjugated diene.

11. The method of claim 10 wherein the alpha-olefin comprises propylene, 1-butene, or mixtures thereof.

12. The method of claim 1 wherein said acylated hydrocarbon polymer comprises at least one succinic acid or succinic anhydride moiety grafted onto the backbone thereof.

13. The method of claim 1 wherein the amount of the polar aprotic solvent is about 1 to about 40 percent by weight of the amount of the acylated hydrocarbon polymer.

14. The method of claim 1 wherein the solution of the amine is maintained at a temperature of about 15° C. to about 40° C. when it is added to the mixing device.

15. The method of claim 1 wherein the aromatic amine comprises 3-nitroaniline, 4-(4-nitrophenylazo)aniline (Disperse Orange 3), aminodiphenylamine, the reaction product of isatoic anhydride and aminodiphenylamine, or mixtures thereof.

16. The method of claim 1 wherein the polar aprotic solvent comprises N-methylpyrrolidone, N,N-dimethylformamide, N,N-dimethyl acetamide, N,N-diethylacetamide, tetramethylene sulfone, a dialkyl ether of an alkylene glycol or of a di(alkylene glycol), or mixtures thereof.

17. The method of claim 1 further comprising adding an aliphatic amine having a single primary amino group to the mixture of step (c) after addition of said aromatic amine.

18. The method of claim 1 wherein the acyl group on the acylated hydrocarbon polymer is a pendant group derived from an acylating agent comprising maleic anhydride, maleic acid, itaconic anhydride, or itaconic acid, which is grafted onto the backbone of said polymer prior to mixing the melted polymer with the solution of the aromatic amine.

19. The method of claim 1 wherein the acylated hydrocarbon polymer is prepared by grafting the backbone of said polymer with the acylating agent in the presence of a peroxide in a first extruder, and subsequently contacting the melted grafted polymer with the solution of the aromatic amine in the first extruder or in a second extruder.

20. The method of claim 19 wherein at least one of the first or, if present, the second extruder, comprises at least one venting zone suitable for removing volatile materials from the reaction mixture.

* * * * *